United States Patent [19]

Evans

[11] 4,157,337
[45] Jun. 5, 1979

[54] PROCESS FOR THE POLYMERIZATION OF CYCLIC DIORGANOPOLYSILOXANES WITH CATION-COMPLEX CATALYSTS

[75] Inventor: Edwin R. Evans, Clifton Park, N.Y.

[73] Assignee: General Electric Company, Waterford, N.Y.

[21] Appl. No.: 813,250

[22] Filed: Jul. 6, 1977

Related U.S. Application Data

[63] Continuation-in-part of Ser. No. 574,333, May 5, 1975, abandoned.

[51] Int. Cl.$^2$ .............................................. C07F 7/08
[52] U.S. Cl. .............................................. 260/448.2 E
[58] Field of Search ................................... 260/448.2 E

[56] References Cited

U.S. PATENT DOCUMENTS

| | | | |
|---|---|---|---|
| 3,002,951 | 10/1961 | Johannson | 260/46.5 |
| 3,050,492 | 8/1962 | Polmanteer et al. | 260/37 |
| 3,584,027 | 6/1971 | Damle et al. | 260/448.2 E |
| 3,661,962 | 5/1972 | Geipel | 260/448.2 E |
| 3,779,987 | 12/1973 | Razzano | 260/46.5 R |

OTHER PUBLICATIONS

Boileau et al., "Polymer Letters Edition", vol. 12, pp. 217–220 (1974).

Primary Examiner—Paul F. Shaver
Attorney, Agent, or Firm—Morgan, Finnegan, Pine, Foley & Lee

[57] ABSTRACT

Diorganopolysiloxane homo- and copolymers having a viscosity from 50 to 200,000,000 centipoise at 25° C., are produced by (A) reacting a composition of (i) a first cyclic siloxane having 3 to 6 units alone or admixed with (ii) a second cyclic tetrasiloxane having 3 to 6 units, (i) being present in an amount of 30 to 100 mol % of the composition, at a temperature in the range of 90° to 150° C. and in the presence of 5 to 500, preferably 5 to 50 parts per million, as KOH, of a catalyst comprising (a) KOH complexed with a molar equivalent of a cyclic polyesther, or (b) a silanolate of KOH complexed with a molar equivalent of a cyclic polyether and (B) neutralizing the catalyst in the reaction mixture after equilibrium has been reached. Especially useful products of the process are homopolymers and copolymers including siloxane chain units of the formula R R$^1$ SiO wherein R$^1$ is alkyl, halogenated alkyl or cycloalkyl, and preferably, perfluoroalkyl, and R is the same as R$^1$ and, in addition, methyl, ethyl, vinyl or phenyl.

33 Claims, No Drawings

PROCESS FOR THE POLYMERIZATION OF CYCLIC DIORGANOPOLYSILOXANES WITH CATION-COMPLEX CATALYSTS

CROSS-REFERENCE TO RELATED APPLICATION

This application is a continuation-in-part of copending application Ser. No. 574,333, filed May 5, 1975, now abandoned.

FIELD OF THE INVENTION

The present invention relates to a process for producing diorganopolysiloxane homo- and copolymers from mixtures of cyclic siloxanes and, more specifically, to the production of such homo- and copolymers from mixtures of cyclic siloxanes using a novel cation-complex catalyst comprising potassium hydroxide complexed with a cyclic polyether.

BACKGROUND OF THE INVENTION

It is well known that siloxane homo- and copolymers can be prepared to provide an advantageous balance of properties and economics. Moreover, in comparison with mixtures of homopolymers, copolymers are generally more effective in producing any desired property, and the tendency to separate on a microscopic scale is avoided. Homopolymers can be made by polymerizing the cyclic siloxanes, subject to the difficulties mentioned hereinafter, if one of the silicon-bonded substituents comprises an aliphatic radical or haloaliphatic radical of 3 carbon atoms or greater. Copolymers of diorganopolysiloxanes can also be prepared by mixing and polymerizing the respective cyclic siloxanes, but, again, if one of them has a silicon-bonded aliphatic or haloaliphatic radical of three carbon atoms or greater, then only up to 20 mol % of the other co-monomer, which does not include such a structural limitation, can be incorporated. Johannson, U.S. Pat. No. 3,002,951, illustrates the problem and the limitation. Johannson discloses that if a cyclic trisiloxane, having a 3 or more carbon silicon-bonded organo substituent, is reacted in admixture with another cyclic diorganosiloxane compound, in the presence of a strong alkali catalyst, under non-equilibrating conditions, only up to 10 mol % of the co-monomer will polymerize. It is stated in Johannson that if one starts with cyclic tetrasiloxanes and subjects them to the same alkaline polymerization conditions, that no apparent polymerization occurs. At the other end of the composition range, Polmanteer et al., U.S. Pat. No. 3,050,492 disclose that only up to about 15 mol % of fluorosilicone can be copolymerized under equilibration conditions.

Surprisingly, now, it has been discovered that potassium hydroxide, alone, or as the silanolate, can be complexed with cyclic polyethers (the so-called Crown ethers) and the complex is very efficient to catalyze homo- and copolymerization of a very wide variety of cyclics, including the difficult or previously thought to be impossible ones, into oils and gums of substantial commercial utility. Moreover, copolymerization of the cyclic tetramer with other cyclic co-monomers will occur over a wide variety of composition ranges, and is not limited to the 90 mol % maximum found under non-equilibrating conditions with the cyclic trimer as reported by Johannson, or the 15 mol % maximum found under equilibrating conditions by Polmanteer et al.

The process using the new catalysts of this invention has many important advantages. It permits the use of cyclic tetramers which are more readily obtained from hydrolyzate cracking than the trimers used by Johannson (although the latter can be used). Tetramers substituted with "difficult" substituents, readily homo- and copolymerize. The process can be employed with conventional chain-stoppers to provide homo- and copolymers with molecular weights varying over a wide range, to produce oils and gums. Polymerization is generally rapid. Conversion of the cyclic starting materials to the desired polymerized products are generally high. Residues of catalyst are readily removed and any residue from the cyclic polyether catalyst component does not adversely affect, e.g., destabilize, the resultant polymer or copolymer.

The present invention is of prime importance in the use of methyl-3,3,3-trifluoromethylsiloxane cyclic tetramer as a starting material. Both Johannson, cited above, and Pierce et al., U.S. Pat. No. 2,979,519, disclose that such cyclic tetrasiloxanes cannot be homopolymerized. Moreover, the catalyst and conditions set forth herein permit the copolymerization of this fluorosilicone tetramer with dimethyl tetramer (or dimethyl trimer) in the range of 30 to 98 mol % fluorosilicone. The ability to produce such copolymers is an advance in the art since, if the full solvent resistance properties of the fluorosilicone were not needed, a blend of fluorosilicone polymer with methyl polymers would be necessary. However, a copolymer is more efficient in solvent resistance than a blend at the same fluorosilicone content. In addition, while stable blends of fluorosilicone and methyl polymers can be made for high viscosity gums, it is impossible to make stable blends of lower viscosity oils, such as would be used in room temperature vulcanizing and fluid products, because the incompatibility of the fluorosilicone oil with the methyl oil will cause separation of these two components. Thus, the best balance of economy and solvent resistance is achieved.

It is, accordingly, a principal object of the present invention to provide a process for producing diorganopolysiloxane homo- or copolymer gums or oils in high yield, using a cyclic monomer, and especially those wherein at least one of the organo groups attached to the silicon atom is aliphatic or haloaliphatic of at least three carbon atoms or more.

Another object of the present invention is to provide low molecular weight diorganopolysiloxane homo- and copolymer oils and gums having a viscosity from 30 to 200,000,000 centipoise at 25° C. and particularly those wherein at least one of the organo groups attached to the silicon atoms in one of the co-monomers is aliphatic or haloaliphatic of 3 carbon atoms or more, by a process comprising equilibrating cyclic siloxanes, alone, or in admixture of cyclic co-monomers in the presence of certain novel crown ether-cation-complex catalysts.

A further object of the present invention is to provide diorganopolysiloxane copolymer oils or gums having a viscosity from 30 to 200,000,000 centipoise at 25° C., wherein at least one of the co-monomers comprises 30 to 85 mol % of the copolymer units, and includes organo groups attached to the silicon atoms having at least 3 carbon atoms, and particularly, a —$CH_2CH_2R^7$ substituent group, where $R^7$ is perfluoroalkyl, using a cyclic tetrasiloxane as a co-monomer.

SUMMARY OF THE INVENTION

In accordance with the foregoing objects, the present invention provides a process for producing a diorganopolysiloxane oil or gum having a viscosity from 50 to 200,000,000 centipoise at 25° C. comprising (A) reacting a composition comprising
  (i) a cyclic polysiloxane of the formula, $(R\ R^1\ SiO)_x$ or a mixed such polysiloxane where R is methyl, ethyl, vinyl or phenyl and $R^1$ is as defined for R and in addition, alkyl, halogenated alkyl, or cycloalkyl, each of 3 to 8 carbon atoms and x is from 3 to 6, and
  (ii) a cyclic polysiloxane of the formula, $(R_2^2\ SiO)_y$ wherein R is, independently, methyl, ethyl, vinyl or phenyl and y is from 3 to 6, or a mixed such polysiloxane, (i) being present in an amount of from 30 to 100 mol % of the composition at a temperature in the range of 20° to 160° C. in the presence of 5 to 500 parts per million, as KOH, of a catalyst comprising (a) KOH complexed with a molar equivalent of a cyclic polyether, or (b) a silanolate of KOH complexed with a molar equivalent of a cyclic polyether and (B) neutralizing the catalyst in the reaction mixture after equilibrium has been reached.

Preferably, 5 to 50 parts per million, as KOH, of catalyst (a) or (b) are used.

A preferred embodiment comprises neutralizing the catalyst with an inorganic acid, such as phosphoric acid, an organosilane of the formula $R_b^6\ SiX_{4-b}$, wherein $R^6$ is alkyl, cycloalkyl, vinyl or phenyl, and, preferably, alkyl, cycloalkyl of 1 to 8 carbon atoms, and X is bromine or chlorine and b is from 0 to 3.

It is preferred to obtain the product homo- or copolymer in essentially pure form, after the equilibration and neutralization steps are complete by heating the mixture to 150° to 200° C. at a vacuum of 1 to 100 millimeters of mercury to strip off all volatiles. The equilibration reaction preferably will require from ½ hour to 20 hours and, more preferably, from 50 minutes to 12 hours. For maximum efficiency, it is preferred that the cyclic siloxanes composition to be homo- or copolymerized will have less than 20 parts per million of trifunctional silanes, less than 200 parts per million of monofunctional siloxanes, and less than 10 parts per million of water. The optional co-monomer (ii) can also be a cyclic trimer, tetramer, pentamer or hexamer. These are known in the art, see, e.g., the Johannson patent cited above. Preferably, (i) and (ii) will be trimers or tetramers, and especially preferably (i) will be a tetramer. In copolymerizations, the amount of co-monomer (i) in admixture with (ii) will vary between 30 and 98 mol %. Preferably, (i) will comprise from 30 to 85 mol % of (i) and (ii). Further, preferably, the $R^1$ substituent radical in the above formulae of the siloxanes is $R^7CH_2CH_2$, where $R^7$ is a perfluoroalkyl radical of 1 to 6 carbon atoms, and R and $R^2$ are each methyl. The process provides diorganopolysiloxane homo- and copolymer oils or gums of from 30 to 200,000,000 centipoise viscosity at 25° C. depending on whether or not, for example, a conventional chain-stopper is employed.

Among the more valuable products provided by the invention are novel diorganopolysiloxane copolymer oils or gums having a viscosity of from 30 to 100,000,000 centipoise viscosity at 25° C., which have copolymer units as defined for (i) and (ii) above in which the amount of (i) ranges from 30 to 85 mol % of (i) and (ii).

DETAILED DESCRIPTION OF THE INVENTION

The R, $R^1$ and $R^2$ substituents in cyclic siloxanes (i) and cyclic siloxanes (ii) above, are representative of monovalent hydrocarbon radicals and halogenated monovalent hydrocarbon radicals that are well known as attachments to silicon atoms. However, at least the $R^1$ substituent contains 3 carbon atoms, or more. In the formulae above, R is the same as $R^1$ or is methyl, ethyl, vinyl or phenyl. $R^1$ is alkyl, such as propyl, butyl or hexyl, and the like, of 3 to 8 carbon atoms; halogenated alkyl, such as 3-chloropropyl, 4-chlorobutyl, 3-fluoropropyl, 3,3-difluoropropyl, 3,3,3-trifluoropropyl, and the like of 3 to 8 carbon atoms, such as cyclopentyl, cyclohexyl, cycloheptyl, and the like. Preferably, the $R^1$ is a substituted alkyl group such as, $-CH_2CH_2R^7$, wherein $R^7$ radical is perfluoroalkyl containing from 1 to 6 carbon atoms, such as perfluoromethyl, perfluoroethyl, perfluorohexyl, and the like. Most preferably, the $R^1$ is 3,3,3-trifluoropropyl, R is methyl or ethyl, and $R^2$ is methyl or ethyl, the latter two especially preferably being methyl.

The catalyst used in this invention is a cyclic polyether-cation complex. Essential ingredients are potassium hydroxide and a cyclic polyether, preferably in molar equivalent amounts. The potassium hydroxide can be used in the form of a silanolate in the ether complex. Silanolates are well known in this art, but preferably, the silanolate will include units of the formula, $$R_2^4\ SiO$$ 

wherein $R^4$ is alkyl of from 1 to 8 carbon atoms, cycloalkyl of from 4 to 8 carbon atoms or phenyl, preferably, methyl. The KOH can be converted to the silanolate by mixing with a linear or cyclic polysiloxane, e.g., octamethyl cyclotetrasiloxane. The cyclic polyethers are well known. They are often called crown ethers. They are believed to complex with the KOH to form a cation-complex of the ion dipole type through the coordination of the cation by the oxygen atoms. In general, any crown ether capable of forming such a complex can be used, but it is preferred to employ 1,4,7,10,13,16-hexaoxacyclooctadecane (18-Crown-6) (I):

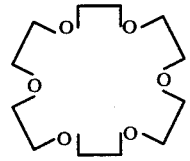

the "brackets" designating $-CH_2CH_2-$ groups; or 2,5,8,15,18,21-hexaoxatricyclo[20,4,0,0 9:14]hexacosane (dicyclohexyl-18 Crown-6) (II):

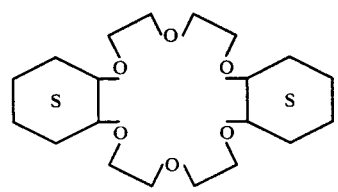

Some of the cyclic polyethers are available commercially; others can be made by methods described in Journal of the American Chemical Society 81, 7017 (1967) by C. J. Pederson. The complex forms readily merely by bringing the reactants together, even in the absence of a solvent. In one preferred way of proceeding, KOH is collected in octamethylcyclotetrasiloxane and then converted into the complex catalyst by addition of the cyclic polyether.

Preferably, starting materials (i) and (ii) will be obtained from diorganodihalogensilanes of the formula $R^1RSiX_2$ and $R^2SiX$ wherein R, $R^1$ and $R^2$ are as previously defined and X is halogen, such as chlorine or bromine, and preferably, chlorine. Such diorganodichlorosilanes, at a purity of at least 99% by weight are added to water at room temperature, e.g., 20°–25° C. to provide from 2 to 10 moles of water per mole of the diorganodihalogensilane. In the most preferred case, after the diorganodihalosilanes have been added to the water mixture will contain 20% by weight of HCl. Optionally, hydrolysis may be carried out in the presence of a water-immiscible solvent such as, for example, toluene, xylene, benzene, and the like. The use of a solvent facilitates the separation of the hydrolyzate from the aqueous acid solution. Preferably, a water-immiscible organic solvent is added to the water prior to the addition of the diorganodihalosilanes. the organohalosilanes, preferably at 99+% purity, are added to the water and water-immiscible solvent during ½ hour to 2 hours, with agitation. The hydrolyzate dissolves in the solvent phase, and this is then separated from the water phase. The hydrolyzate and organic solvent are then neutralized with a mild base, such as sodium bicarbonate, to a pH of about 7 to 8. The hydrolyzate product contains mostly cyclic polysiloxanes of from 3 silicon atoms to 10 silicon atoms and low molecular weight linear silanol end-stopped diorganopolysiloxanes. Heating the hydrolyzate at elevated temperatures then is used to remove the solvent by overhead distillation. The hydrolyzate is then cracked by a procedure comprising adding from 0.1 to 5% by weight and preferably, from 0.1 to 2% by weight of a cracking catalyst selected from the class consisting of potassium hydroxide, and cesium hydroxide, and heating. Preferably, the amount of catalyst that is utilized is from 0.5 to 2% by weight.

Preferably, heating temperatures of above 150° C. and between 150° to 200° C. will be used and preferably, heating will be carried out under a vacuum of 1 to 100 millimeters of mercury and more preferably, under a vacuum of 5 to 40 millimeters of mercury for from 1 to 5 hours. There will be continually distilled overhead a mixture of cyclic polysiloxanes and, specifically, cyclic tripolysiloxanes, cyclic tetrapolysiloxanes, cyclic pentapolysiloxanes and cyclic hexapolysiloxanes. The cracking procedure is utilized to maximize the formation of three types of cyclics from the broad range in the hydrolyzate. It permits conversion of 95% by weight of the hydrolyzate cyclic trisiloxanes, cyclic tetrasiloxanes and cyclic pentasiloxanes and predominantly, cyclic tetrapolysiloxanes.

The cyclic siloxanes may be separated by known distillation procedures from the other cyclics. For example, distillation can be carried out at temperatures of 80° to 200° C. and under pressures of from 1 to 100 millimeters of mercury and, more preferably, at from 1 to 20 millimeters of mercury. Such distillation procedures will readily lead to essentially pure cyclic tetrasiloxane of Formula (i) above, and the cyclic trisiloxanes and the cyclic pentasiloxanes can be recycled back into the cracking vessel and mixed with additional hydrolyzate to again produce by the cracking procedure described previously, a mixture of cyclic trisiloxanes, cyclic tetrasiloxanes and cyclic pentasiloxanes in 95% yield. Essentially pure cyclic tetrasiloxane of Formula (i), obtained in 70 to 80% yield from the siloxane hydrolyzate, contains less than 200 parts per million of monofunctional siloxy units, and less than 20 parts per million of trifunctional siloxy units. More than the above-indicated amount of monofunctional siloxy units or trifunctional siloxy units, should not be present so as to avoid gelling during the subsequent equilibration according to this invention.

The component (ii), if used as co-monomer, can also be obtained by hydrolysis and cracking, as described above. The impurity levels should be held to the limits stated to completely avoid problems with gelling.

It is also preferred that there be present less than 10 parts per million of water in the composition of cyclic siloxanes (i) and cyclic siloxanes (ii), if used, which is to be utilized with the catalyst to make polymers. Removal of all but traces of water is accomplished by heating to 100° C. or above, with a nitrogen purge. This effectively reduces the water content of the cyclic siloxane composition to less than 10 parts per million. It has been found that if there is substantially more than this amount of water present in the cyclic siloxanes, then the desired low molecular weight oil or high molecular weight diorganopolysiloxane homo- or copolymer gum will not be formed in commercially attractive yields.

To prepare the homo- or copolymers, the cyclic polysiloxanes, (i) and (ii) above, are placed in a vessel. The amount of catalyst and the reaction temperature are important. Specifically, there will be used 5 to 500 parts per million, preferably, 5 to 50, more preferably, 10 to 30 parts per million, and most preferably, 15–20 parts per million (as KOH) of that catalyst. Preferably, the polymerization will be carried out at a temperature of from 20° to 160° C. and more preferably, at a temperature of 90° to 150° C. Especially preferably, the temperature will be from 110° to 130° C., and specifically, 120° C. If a temperature below 20° or above 160° C. is used, then the maximum yield of diorganopolysiloxane homo- or copolymer is not achieved and, below 20°, the polymerization rate is somewhat too slow.

The cyclic siloxane composition of Formulae (i) and (ii) above, and the catalyst are heated or cooled to the indicated temperature range for from ½ hour to 20 hours, preferably, 50 minutes to 12 hours, during which time equilibrium is reached. At this point, 70 to 88% by weight or more of the cyclic siloxanes will have been converted to the desired diorganopolysiloxane homo- or copolymer oil or gum. In this case, there will be 12 to 30% of the cyclic polysiloxanes of Formulae (i) and (ii) in the equilibrated mixture. At this point, the reaction mixture is cooled, e.g., to 0° to 25° C., and there is added the agent to neutralize the catalyst. A number of conventional neutralizing agents may be used but preferably, there will be used either phosphoric acid, an organohalosilane or halosilane of the formula $R_b^6 SiX_{4-b}$, wherein $R^6$ is alkyl, cycloalkyl, vinyl or phenyl, the alkyl and cycloalkyl groups having from 1 to 8 carbon atoms, and X is bromine or chlorine and is e.g., trimethylchlorosilane, dimethyldichlorosilane and b is from 0 to 3.

After neutralization, the reaction mixture is heated at elevated temperatures, e.g., 150° to 200° C. under a vacuum of 1 to 100 millimeters of mercury. This strips off all cyclic polysiloxanes, and these may be recycled into the equilibration vessel. There remains a diorganopolysiloxane homo- or copolymer oil or gum.

In accordance with known techniques, the viscosity of the copolymer can be controlled by adding a chain-stopper to the composition of co-monomers (i) and (ii) and catalyst. Such chain-stoppers can be, for example, disiloxanes or low molecular weight diorganopolysiloxanes having triorganosiloxy terminal units, that is, having monofunctional terminated units. The organo substituents in such chain-stoppers are typically alkyl of 1 to 8 carbon atoms, vinyl, phenyl or cycloalkyl of 4 to 8 carbon atoms, such as trifluoropropyl.

Typically, the preferred chain-stopper will be of the formula,

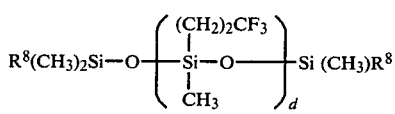

wherein $R^8$ is $-CH_3$ or $-CH=CH_2$ and d is 3 to 7. As will be obvious, the amount of chain-stopper that is used in the equilibration mixture will be selected to produce the desired final molecular weight or viscosity of the diorganopolysiloxane copolymer oil or gum. Illustratively, higher amounts, e.g., 30 ml. of chain-stopper per 100 ml. of mixed cyclics will produce the lowest molecular weight oils, e.g., 50 centipoise at 25° C. Smaller amounts, e.g., 0.01 ml. of chain-stopper per 100 ml. of mixed cyclics will produce higher molecular weights, e.g., 100,000 centipoise at 25° C. The highest molecular weight will be obtained without chain-stopper.

The process of this invention produces linear diorganopolysiloxane homo- or copolymer oils or gums in which each silicon atom in the respective units has an R and $R^1$ and $R^2$ substituent group. The copolymer oil or gum will have a viscosity of between 50 and 200,000,000 centipoise at 25° C. Obviously, the homo- and copolymer oils and gums can be formulated, e.g., by mixing with reinforcing fillers, such as fumed silica or precipitated silica; extending fillers, such as zinc oxide, iron oxide, titanium oxide, diatomaceous earth, and the like; heat aging additives, such as iron oxide; pigments, and other additives, such as flame retardant for instance, platinum, by itself, or in combination with other materials and self-bonding additives, such as for instance, triallylisocyanurate. The homo- and copolymer gums can be mixed into a uniform mass to which is added a curing agent, e.g., a peroxide curing agent, such as benzoyl peroxide or dicumyl perxoide. The resulting composition can be cured at elevated temperatures, e.g., from 100° to 300° C., or they can be cured by radiation to produce a homo- or copolymer silicone elastomer.

DESCRIPTION OF THE PREFERRED EMBODIMENTS

The following examples are for the purpose of illustrating the present invention. They are not to be construed to limit the invention in any manner whatsoever.

EXAMPLE 1

In a resin flask is placed 100 parts of octamethylcyclotetrasiloxane and the contents are purged with dry nitrogen for 30 minutes to reduce the water content to below 10 parts per million. KOH is colloided with sufficient octamethylcyclotetrasiloxane and one molar equivalent (based on KOH) of the cyclic polyether, 1,4,7,10,13,16-hexaoxacyclooctadecane, is reacted therewith until formation of a cationcomplex is substantially complete. The tetramer is heated to 160° C. and the complex is added to the tetramer in an amount to provide 10 ppm (as KOH). Polymerization is rapid, equilbrium being reached in 10–12 minutes. The catalyst is neutralized by adding a 1% solution of phosphoric acid in tetrahydrofuran. The mixture is heated to 155° C. under a vacuum of 1 mm Hg. Volatiles are distilled and collected. The final product is obtained in about an 88% yield and comprises a polydimethylsiloxane gum of about 100,000,000 centipoise viscosity at 25° C. This gum is suitable for use in formulating silicone elastomers.

EXAMPLE 2

The procedure of Example 1 is repeated, substituting for the cyclic polyether used therein, the cyclic polyether, 2,5,8,15,18-21-hexaoxatricyclo[20,4,0,0$^{9,14}$]hexacosane. Substantially the same results are obtained.

EXAMPLE 3

The procedure of Example 1 is repeated, substituting for the octamethylcyclotetrasiloxane the compound 1,3,5,7-tetramethyl-tetrakis-1,3,5,7-(3,3,3-trifluoropropyl)cyclotetrasiloxane. There is obtained, as the final product, a methyl,-3,3,3-trifluoropropylpolysiloxane homopolymer gum, which is suitable for formulation into oil resistant silicone rubber compositions.

EXAMPLE 4

The procedure of Example 3 is repeated, but there is included in the reaction mixture 4 ml. of the chain-stopper compound: dimethyl-vinyl terminated methyl-3,3,3-trifluoropropylpolysiloxane averaging 5 siloxane units. The final product is a dimethylvinyl terminated methyl-3,3,3-trifluoropropylpolysiloxane homopolymer oil, suitable for use as a plasticizer or a de-foamer.

EXAMPLE 5

A fluorosilicone copolymer is prepared by adding 100 parts of a 70:30 mol % mixture of 1,3,5,7-tetramethyl-tetrakis-1,3,5,7-(3,3,3-trifluoropropyl)cyclotetrasiloxane and octamethylcyclotetrasiloxane to a reaction flask and the water content is reduced by dehydration with dry nitrogen. To two mls. of octamethylcyclotetrasiloxane is added a small quantity of KOH and then a molar equivalent (based on KOH) of 1,4,7,10,13,16-hexaoxacyclooctadecane is complexed with the K+ cation. Twenty ppm of the complexed catalyst, as KOH, is added to the monomer mixture at 120° C. and the mixture is heated for 12 hours. The product contains 8–12% of volatiles, which are removed, after neutralizing the catalyst with trimethylchlorosilane, by stripping at 155°–160° C. at 1–2 mm Hg vacuum. The copolymer product has a viscosity of 65,000–70,000 centipoise at 25° C.

EXAMPLE 6

The procedure of Example 5 is repeated substituting a 50:50 mol % mixture of (trifluoropropylmethyl:dimethylsiloxane), and the corresponding fluorosilicone copolymer is obtained in good yield.

The presence of the residual cyclic polyether in the final product is not detrimental to polymer stability.

The above detailed description is seen to provide simple and straight-forward procedure for producing low molecular weight and high molecular weight diorganopolysiloxane homo- and copolymer oils and gums from cyclic siloxanes. It is seen to be especially useful when one of the substituent groups attached to the silicon atom in such cyclic starting materials is a high molecular weight substituent group, that is, an aliphatic or haloaliphatic radical of 3 carbon atoms or more, alone, or in admixture with cyclic comonomers. Such homo- and copolymer gums may be advantageously used to produce silicone elastomers having outstanding properties such as, for instance, increased resistance to degradation by oil, as compared to silicone elastomers formed from diorganopolysiloxane gums where the organo groups are mostly composed of low molecular weight and aromatic substituent groups such as methyl or vinyl. The oils are useful as plasticizers, and the like.

In addition to the amounts of catalyst shown in the examples, the catalyst according to this invention can be used in amounts in excess of the preferred range of 5 to 50 parts per million, as KOH. For instance, when the procedures described in the examples are repeated, using 145 parts per million, as KOH, of the respective catalysts, substantially the same results are obtained.

Obviously, many variations will suggest themselves to those skilled in the art. All such obvious variations are within the full intended scope of the invention as defined in the appended claims.

I claim:

1. A process for producing a diorganopolysiloxane having a viscosity of from 50 to 200,000,000 centipoise at 25° C. comprising (A) reacting a composition comprising (i) a cyclic polysiloxane of the formula, $$(R\ R^1\ SiO)_x$$

or a mixed such polysiloxane wherein R is methyl, ethyl, vinyl or phenyl and $R^1$ is as defined for R and in addition, alkyl, halogenated alkyl, or cycloalkyl, each of 3 to 8 carbon atoms and x is from 3 to 6, and (ii) a cyclic polysiloxane of the formula, $$(R_2^2\ SiO)_y$$

wherein $R^2$ is, independently, methyl, ethyl, vinyl or phenyl and y is from 3 to 6, or a mixed such polysiloxane, (i) being present in an amount of from 30 to 100 mol % of the composition, at a temperature in the range of 20° to 160° C. in the presence of 5 to 500 parts per million, as KOH, of a catalyst comprising (a) KOH complexed with a molar equivalent of a cyclic polyether, or (b) a silanolate of KOH complexed with a molar equivalent of a cyclic polyether and (B) neutralizing the catalyst in the reaction mixture after equilibrium has been reached.

2. A process as defined in claim 1 wherein the cyclic polyether is 1,4,7,10,13,16-hexaoxacyclooctadecane or 2,5,8,15,18,21-hexaoxatricyclo[20,4,0,0^{9,14}]-hexacosane.

3. A process as defined in claim 1 wherein the silanolate includes units of the formula $R_2^4\ SiO$ wherein the $R^4$ groups, independently, are alkyl of from 1 to 8 carbon atoms, cycloalkyl of from 4 to 8 carbon atoms or phenyl.

4. A process as defined in claim 3 wherein $R^4$ is methyl.

5. A process as defined in claim 1 wherein the catalyst is neutralized with phosphoric acid or a compound of the formula, $R_b^6\ SiX_{4-b}$, where $R^6$ is alkyl, cycloalkyl, vinyl or phenyl, X is bromine or chlorine, and b is from 0 to 3.

6. A process as defined in claim 1 including after step (b) the further step comprising heating the reaction mixture to 150° to 200° C. at a vacuum of 1 to 100 mm of Hg to strip off all volatiles.

7. A process as defined in claim 1 wherein the cyclic polysiloxanes are reacted with the catalyst for from ½ hour to 20 hours.

8. A process as defined in claim 1 wherein the cyclic polysiloxanes and mixtures thereof contain less than 20 parts per million of trifunctional siloxanes, less than 200 parts per million of monofunctional siloxanes, and less than 10 parts per million of water.

9. A process as defined in claim 1 wherein $R^1$ is $R^7CH_2CH_2-$ and $R^7$ is perfluoroalkyl of 1 to 6 carbon atoms.

10. A process as defined in claim 1 wherein $R^1$ is $CF_3CH_2CH_2-$; R and $R^2$ are each methyl; and x and y are 3 or 4.

11. A process as defined in claim 10 wherein x is 4 and y is 3 or 4.

12. A process as defined in claim 1 wherein component (i) comprises 100 mol % of the composition.

13. A process as defined in claim 1 wherein cyclic polysiloxane (i) is present in an amount of from 30 to 96 mol % of the composition.

14. A process as defined in claim 1 wherein cyclic polysiloxane (i) is present in an amount of from 30 to 85 mole % of the compositon.

15. A process as defined in claim 1 wherein step (A) is carried out at a temperature in the range of 90° C. to 150° C.

16. A process for producing a diorganopolysiloxane having a viscosity of from 50 to 200,000,000 centipoise at 25° C. comprising (A) reacting a composition comprising (i) a cyclic polysiloxane of the formula, $$(R\ R^1\ SiO)_x$$

or a mixed such polysiloxane wherein R is methyl, ethyl, vinyl or phenyl and $R^1$ is as defined for R and in addition, alkyl, halogenated alkyl, or cycloalkyl, each of 3 to 8 carbon atoms and x is from 3 to 6, and (ii) a cyclic polysiloxane of the formula, $$(R_2^2\ SiO)_y$$

wherein $R^2$ is, independently, methyl, ethyl, vinyl or phenyl and y is from 3 to 6, or a mixed such polysiloxane, (i) being present in an amount of from 30 to 100 mol % of the composition, at a temperature in the range of 20° to 160° C. in the presence of 5 to 50 parts per million, as KOH, of a catalyst comprising (a) KOH complexed with a molar equivalent of a cyclic polyether, or (b) a silanolate of KOH complexed with a molar equivalent of a cyclic polyether and (B) neutralizing the catalyst in the reaction mixture after equilibrium has been reached.

17. A process as defined in claim 16 wherein the cyclic polyether is 1,4,7,10,13,16-hexaoxacyclooctadecane or 2,5,8,15,18,21-hexaoxatricyclo[20,4,0,0$^{9,14}$]-hexacosane.

18. A process as defined in claim 16 wherein the silanolate includes units of the formula $R_2^4$ SiO wherein the $R^4$ groups, independently, are alkyl of from 1 to 8 carbon atoms, cycloalkyl of from 4 to 8 carbon atoms or phenyl.

19. A process as defined in claim 18 wherein $R^4$ is methyl.

20. A process as defined in claim 16 wherein the catalyst is neutralized with phosphoric acid or a compound of the formula, $R_b^6$ SiX$_{4-b}$, where $R^6$ is alkyl, cycloalkyl, vinyl or phenyl, X is bromine or chlorine, and b is from 0 to 3.

21. A process as defined in claim 16 including after step (b) the further step comprising heating the reaction mixture to 150° to 200° C. at a vacuum of 1 to 100 mm of Hg to strip off all volatiles.

22. A process as defined in claim 16 wherein the cyclic polysiloxanes are reacted with catalyst for from ½ hour to 20 hours.

23. A process as defined in claim 16 wherein the cyclic polysiloxanes and mixtures thereof contain less than 20 parts per million of trifunctional siloxanes, less than 200 parts per million of monofunctional siloanes, and less than 10 parts per million of water.

24. A process as defined in claim 16 wherein $R^1$ is $R^7CH_2CH_2$— and $R^7$ is perfluoroalkyl of 1 to 6 carbon atoms.

25. A process as defined in claim 16 wherein $R^1$ is $CF_3CH_2CH_2$—; R and $R^2$ are each methyl; and x and y are 3 or 4.

26. A process as defined in claim 25 wherein x is 4 and y is 3 or 4.

27. A process as defined in claim 16 wherein component (i) comprises 100 mol % of the composition.

28. A process as defined in claim 16 wherein cyclic polysiloxane (i) is present in an amount of from 30 to 96 mol % of the composition.

29. A process as defined in claim 16 wherein cyclic polysiloxane (i) is present in an amount of from 30 to 85 mole % of the composition.

30. A process as defined in claim 16 wherein step (A) is carried out at a temperature in the range of 90° C. to 150° C.

31. A process for producing an organopolysiloxane copolymer comprising (A) reacting a composition comprising:
 (i) from 70 to 50 mol % of 1,3,5,7-tetramethyl-tetrakis-1,3,5,7-(3,3,3-trifluoropropyl) cyclotetrasiloxane, and
 (ii) from 30 to 50 mol % of octamethylcyclotetrasiloxane,
at a temperature of 120° C. for 12 hours in the presence of 20 parts per million, as KOH, of a catalyst comprising KOH complexed with a molar equivalent of 1,4,7,10,13,16-hexaoxacyclooctadecane, and (B) neutralizing the catalyst in the reaction mixture after equilibrium has been reached.

32. A process as defined in claim 31 wherein the copolymer reaction product has a viscosity of 65,000–70,000 centipoise at 25° C.

33. A process as defined in claim 31 including after step (B) the further step comprising heating the reaction mixture at a temperature of 155°–160° C. and a vacuum of 1–2 mm of Hg, to strip off all volatiles.

* * * * *